Figure 1:
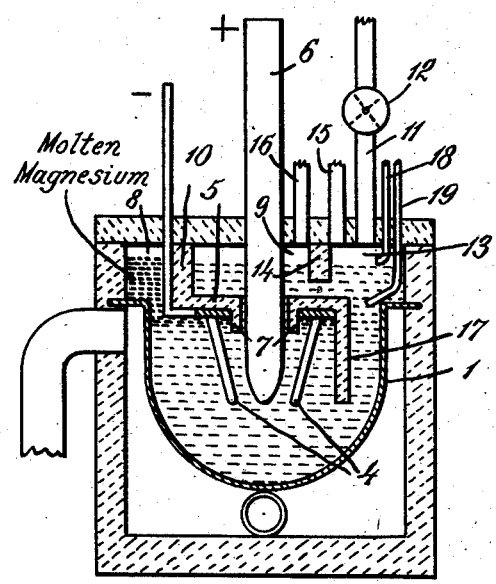

Sept. 3, 1946.   J. L. WOOD ET AL   2,406,935
PREPARATION OF FUSIONS CONTAINING MAGNESIUM CHLORIDE
Filed Oct. 16, 1941

INVENTORS
Joseph Leonard Wood
Robert B. MacMullin
BY
ATTORNEYS

Patented Sept. 3, 1946

2,406,935

UNITED STATES PATENT OFFICE 2,406,935

PREPARATION OF FUSIONS CONTAINING MAGNESIUM CHLORIDE

Joseph Leonard Wood and Robert B. MacMullin, Niagara Falls, N. Y., assignors to The Mathieson Alkali Works, Inc., New York, N. Y., a corporation of Virginia Application October 16, 1941, Serial No. 415,270

7 Claims. (Cl. 204—70)

This invention relates to improvements in the preparation of anhydrous fusions containing magnesium chloride, particularly for the electrolytic production of metallic magnesium.

The electrolysis of magnesium chloride fusions liberates magnesium at the cathode and chlorine at the anode. This electrolysis is usually carried out with fusions somewhat heavier than magnesium metal at operating temperature containing, in addition to the magnesium chloride, various halide diluents modifying the solidification point, the fluidity, the density or other properties of the fusion under conditions such that only the magnesium chloride is electrolytically decomposed. The magnesium chloride thus consumed must be replaced as the operation continues. Since the presence of water in the region of electrolysis involves losses of liberated magnesium through formation of the oxide, decomposition of the chloride with formation of hydrogen chloride and the oxide and power losses otherwise useful for the production of magnesium, the fusion undergoing electrolysis should be anhydrous. The usual processes for the production of magnesium chloride produce, initially, aqueous solutions and, although dehydration of such magnesium chloride solutions to produce the dihydrate can be carried out efficiently and economically, ordinary dehydration much beyond this point involves difficulties including decomposition of the hydrous magnesium chloride with liberation of hydrogen chloride and formation of the oxide.

This invention includes certain operating steps, hereinafter described, which make it possible to prepare anhydrous fusions containing magnesium chloride from the hydrous salt, the dihydrate for example, with at most but limited decomposition of the magnesium chloride.

It has hitherto been proposed to supply the required magnesium chloride by introducing the hydrous salt, magnesium chloride dihydrate for example, into a part of the fused body of salt separated from the region of electrolysis, taking off the water vapor liberated from the resulting dehydration and causing the thus dehydrated magnesium chloride to move in the fused body of salt into the region of electrolysis. In carrying out such proposals, the hydrous magnesium chloride necessarily moves into the fusion through an atmosphere consisting essentially of the water vapor liberated by the dehydration. Further, if the hydrous magnesium chloride is supplied in forms produced by ordinary processing it tends to float, without being immediately wetted, on the surface of the fusion. Under these conditions decomposition of the magnesium chloride, with resulting formation of magnesium oxide and liberation of hydrogen chloride, proceeds rapidly due to the relatively large area of the hydrous magnesium chloride exposed to the atmosphere above the region of dehydration, both as the hydrous salt moves through this atmosphere and as it floats on the surface of the fused body of salt. The decomposition losses involved in supplying pulverulent hydrous magnesium chloride to the fusion range upwards from about 10% or 15% to as much as 50% or more. By supplying hydrous magnesium chloride to the fusion in accordance with this invention, however, such decomposition losses can be reduced to as little as 5% or less.

The operating steps of this invention comprise the charging of hydrous magnesium chloride into a fusion consisting essentially of magnesium chloride and a substantial proportion of halide diluent, the magnesium chloride in proportion not exceeding about 50% by weight, through its upper surface as dense aggregates wettable by the fusion and of a density approximating 0.9–1.5 or better 0.9–1.1, the maintenance of an atmosphere of chlorine or hydrogen chloride above the region of dehydration and the introduction of chlorine or hydrogen chloride into the fusion in the region of addition of the hydrous material, and the maintenance of the presence of pulverulent carbon in the region of dehydration, by incorporation of a proportion of pulverulent carbon not exceeding about 1% by weight in the dense aggregate of magnesium chloride with particular advantage, or by maintenance of a blanket of pulverulent carbon on the upper surface of the fusion in the region of addition of the hydrous material.

If, instead of being supplied as a pulverulent material of relatively low apparent density, the hydrous magnesium chloride is supplied as aggregates having an apparent density of the indicated order, the hydrous magnesium chloride moves through the atmosphere above the region of dehydration with a minimum of exposure to that atmosphere and, being readily wettable by the fusion in this form, moves immediately through the surface of the fusion so that, even though these dense aggregates remain at or near the surface of the fusion until they are themselves dehydrated and melted, the hydrous salt thus supplied is separated from the atmosphere above the region of dehydration by the surface of the fused body of salt except for the brief period of passage through this atmosphere into the fusion. Also, by supplying the hydrous magnesium chloride as aggregates of the indicated density, the hydrous magnesium chloride remains at or near the surface of the fusion until dehydated and melted, permitting immediate escape of liberated water vapor, eliminating another cause of decomposition of magnesium chloride added as the hydrous material or previously dehydrated magnesium chloride present in the fusion.

Such aggregates of hydrous magnesium chloride, of a density approximating 0.9–1.5 or better 0.9–1.1, are conveniently and advantageously formed by briquetting aqueous magnesium chloride reduced approximately to the dihydrate by spray-drying in concurrent flow with a stream of furnace gases at a temperature, for example, of 650°–750° C. and controlling the apparent density of the aggregates by controlling the effective pressure of the briquetting operation. By this step alone, the introduction of the hydrous magnesium chloride as dense aggregates wettable by the fusion and of the indicated density through the upper surface of a fused body of salt containing a substantial proportion, not less than about 50% by weight, of halide diluent as well as magnesium chloride, substantial suppression of decomposition of the magnesium chloride can be accomplished. Further suppression of such decomposition is effected, in accordance with this invention, by maintaining an atmosphere of chlorine or hydrogen chloride above the region of dehydration. This is accomplished by introducing chlorine or hydrogen chloride over the surface of the fused body of salt in this region or, with particular advantage, by introducing chlorine or hydrogen chloride into the fused body of salt, beneath its upper surface, in the region of addition of the anhydrous material. By maintaining the presence of pulverulent carbon in the region of dehydration, particularly as a component of the magnesium chloride aggregates, the decomposition of the magnesium chloride is further suppressed and additional advantages are secured in the elimination of traces of water from the fused salt mixture undergoing electrolysis.

The operating steps of this invention may be applied to the maintenance of a fused body of salt in the cell in which the electrolysis is carried out or they may be applied to the preparation of a fusion in a separate vessel from which the fused anhydrous salt is supplied to the body of salt in the cell. Two forms of apparatus in which the operating steps of this invention may be carried out are illustrated, diagrammatically, in elevation and partly in section, in the accompanying drawing. The electrolytic cell illustrated in the accompanying drawing and described generally below is the invention of William C. Gardiner. The apparatus illustrated in Figure 1 is an electrolytic cell, and the apparatus illustrated in Figure 2 is a separate fusion vessel.

The apparatus illustrated in Figure 1 comprises a cast steel vessel 1, a cathode made up of a plurality of steel rods 4 annularly arranged and depending from a steel plate beneath the partition 5, and an anode, a carbon rod 6, suspended through an opening in the partition 5. An annular baffle 7 extending downwardly from an opening in the partition 5 traps off metallic magnesium liberated at the cathode, the magnesium floating on the fused salt body in the cell, and causes it to flow into a compartment 8 at one side of the upper end of the cell, separated from from the anode compartment 9 by a partition 10. The fused body of salt, halide diluent as well as magnesium chloride, is maintained at a temperature of 700°–800° C. The molten magnesium is withdrawn from compartment 8. Dense aggregates of hydrous magnesium chloride are supplied through connection 11 and sealing mechanism 12, a star valve for example, to the compartment 13 on the other side of the upper end of the cell, the gas space in this compartment being separated from the gas space in the anode compartment by the partition 14. The fused body of salt circulates upwardly from the lower part of the cell around the anode into the anode compartment 9, thence beneath the partition 14 into the supply compartment 13, and thence downwardly into the lower part of the cell. A blanket of pulverulent carbon, maintained by appropriate additions from time to time, either as such or as a component of the dense aggregates of hydrous magnesium chloride, may be maintained on the surface of the fused salt body in the cell in the compartment 13. Chlorine or hydrogen chloride is either introduced over the surface of the fused salt body in the compartment 13 through connection 18 or into the fused salt body in this region through connection 19. The water vapor liberated by the dehydration, together with unreacted chlorine or hydrogen chloride, is discharged through connection 15. Chlorine liberated in the anode compartment 9 is discharged through connection 16. The dense aggregates of hydrous magnesium chloride charged through connection 11 traverse the gas space in compartment 13 and then immediately pass through the upper surface of the fused salt body in this compartment, being readily wetted by the fusion, so that the hydrous magnesium chloride suffers but a minimum exposure to the atmosphere in the compartment 13. These aggregates then remain close to the surface of the fusion in this compartment until, upon dehydration and melting, they become a part of the fusion as anhydrous magnesium chloride. Decomposition of the anhydrous magnesium chloride is thus suppressed, and such decomposition is further suppressed by the introduction of chlorine or hydrogen chloride and by the maintenance of the presence of pulverulent carbon in this region.

The vessel 1, in Figure 1, is arranged in a gas fired furnace chamber to facilitate initiation of the electrolysis. The heat of the electrolysis is usually sufficient to maintain the fusion temperature in the cell.

Figure 2:
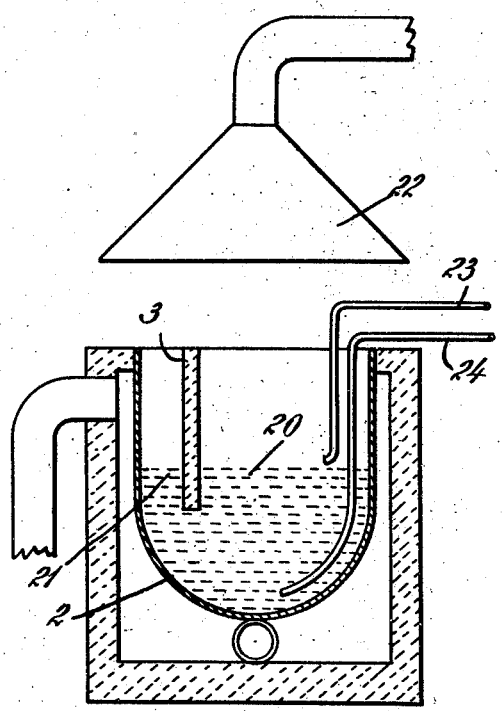

The apparatus illustrated in Figure 2 comprises a fusion vessel 2 arranged in a gas fired furnace chamber to maintain the fusion temperature. A baffle 3 is arranged to separate the region in which dehydration is effected, generally designated 20, from a region, generally designated 21, through which the anhydrous fusion can be withdrawn, for example, to be supplied to an appropriate electrolytic cell. A hood 22 is provided to carry away liberated water and escaping chlorine or hydrogen chloride. A body of fused salt consisting essentially of halide diluent and magnesium chloride, the latter in proportion not exceeding about 50% by weight, is maintained at or above the fusion temperature, 650°–800° C. for example, in the vessel 2. A blanket of pulverulent carbon may be maintained on the fused body of salt above the region 20. Chlorine or hydrogen chloride is introduced either over the surface of the fused body of salt above the region 20 or into the fused body of salt in the region 20 through connection 23 or connection 24, respectively. Dense aggregates of hydrous magnesium chloride are charged into the fused body of salt through the surface of the fused salt body above the region 20. The anhydrous fusion containing magnesium chloride thus prepared is withdrawn as required through region 20. The operation of a separate fusion vessel such as that illustrated in Figure 2 can be combined with the operation of a recovery vessel. That is, the mixture of fused salt containing magnesium chloride and magnesium oxide accumulating in the lower part of the electrolytic cell, such as the cell illustrated in Figure 1, may from time to time be removed from the electrolytic cell and charged into the separate fusion vessel 2 along with the dense aggregates of hydrous magnesium chloride and the recovery of magnesium values of this mixture thus combined with the preparation of the anhydrous fusion containing magnesium chloride for electrolysis.

The halide diluents useful in carrying out this invention include the chlorides of sodium, potassium, calcium and barium and the fluorides of sodium and calcium. In general the chlorides are to be preferred to the fluorides. The composition of the fusion may conform to established practices. It is essential, however, in carrying out this invention, that a substantial proportion, not less than about 50% by weight, of the fusion be made up of halide diluent and that the total magnesium chloride present in the fusion be correspondingly limited.

In actual practice of this invention, charging hydrous magnesium chloride corresponding to about

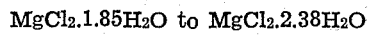

$MgCl_2.1.85H_2O$ to $MgCl_2.2.38H_2O$ and containing about 0.5-1.0% by weight of carbon, anhydrous fusions were prepared with decomposition losses of magnesium chloride of less than 3% with the introduction of chlorine over the surface of or into the fused salt body and with substantially no decomposition losses of magnesium chloride with the introduction of hydrogen chloride. With proportions of carbon not exceeding about 1% by weight incorporated in the magnesium chloride aggregates, substantially all of the carbon is consumed leaving none by mischance to be entrained in the dehydrated fusion moving into the region of electrolysis. When a blanket of pulverulent carbon is used, it should be limited to the surface over the region of active dehydration to minimize any such entrainment.

Notwithstanding the maintenance of fusion temperatures upwards of 650° C., traces of water nevertheless appear in such halide fusions containing magnesium chloride to which magnesium chloride is supplied in hydrated form unless they are heated to temperatures approximating 1000° C. This is evidenced by the decomposition of magnesium added as the metal to such fusions. The maintenance of the presence of pulverulent carbon in the region of dehydration in accordance with this invention, however, has the further advantage of eliminating such residual traces of water at temperatures approximating 700°–800° C.

We claim:

1. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, introducing into said body through its upper surface a charge of briquetted hydrous magnesium chloride, the briquettes of the charge being wettable by the fusion and having a density approximating 0.9–1.5, and taking off the thus liberated water.

2. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, maintaining over the body an atmosphere containing a gas selected from the group consisting of chlorine and hydrogen chloride, introducing into said body through its upper surface a charge of briquetted hydrous magnesium chloride, the briquettes of the charge being wettable by the fusion, and having a density approximating 0.9–1.5 and taking off the thus liberated water.

3. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, introducing into said body through its upper surface a charge of briquetted hydrous magnesium chloride, the briquettes of the charge being wettable by the fusion and having a density approximating 0.9–1.5, introducing into the body in the region of the addition of the briquetted magnesium chloride a gas selected from the group consisting of chlorine and hydrogen chloride, and taking off the thus liberated water.

4. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, maintaining a layer of pulverulent carbon on the upper surface of the body and an atmosphere of chlorine over the body, introducing into said body through its upper surface a charge of briquetted hydrous magnesium chloride, the briquettes of the charge being wettable by the fusion, and having a density approximating 0.9–1.5, and taking off the thus liberated water.

5. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, introducing into said body through its upper surface a charge of briquetted hydrous magnesium chloride containing finely divided carbon in proportions not exceeding about 1% by weight, the briquettes of the charge being wettable by the fusion, and having a density approximating 0.9–1.5, and taking off the thus liberated water.

6. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, introducing into said body through its upper surface a charge of briquetted hydrous magnesium chloride, the briquettes of the charge being wettable by the fusion and having a density approximating 0.9–1.1, and taking off the thus liberated water.

7. In the preparation of anhydrous fusions containing magnesium chloride, the improvement which comprises maintaining a fused body consisting essentially of halide diluent and magnesium chloride, the body having a density somewhat exceeding that of magnesium metal at the temperature of said fused body and containing magnesium chloride in proportions not exceeding about 50% by weight, maintaining a layer of pulverulent carbon on the upper surface of the body, maintaining over the body an atmosphere containing a gas selected from the group consisting of chlorine and hydrogen chloride, introducing into said body through its upper surface a charge of briquetted hydrous magnesium chloride, the briquettes of the charge being wettable by the fusion and having a density approximating 0.9–1.5 and taking off the thus liberated water.

JOSEPH LEONARD WOOD.
ROBERT B. MacMULLIN.